250-201 PF AU 252 EX
FIP8212 XR 3,714,524

United States Patent [19]

Katsuyama

[11] 3,714,524

[45] Jan. 30, 1973

[54] DEVICE FOR GENERATING A SIGNAL SYNCHRONOUS WITH FOCUSING

[75] Inventor: Yoshihisa Katsuyama, Kawasaki, Japan

[73] Assignee: Nippon Kogaku K.K., Tokyo, Japan

[22] Filed: Dec. 16, 1971

[21] Appl. No.: 208,638

[30] Foreign Application Priority Data

Dec. 22, 1970 Japan ..............................45/115210

[52] U.S. Cl. ..................250/235, 250/209, 250/201, 356/125

[51] Int. Cl. ..............................................H01j 3/14

[58] Field of Search .250/234, 235, 222 M, 209, 201; 356/124, 125, 126; 95/44 C

[56] References Cited

UNITED STATES PATENTS

| | | | |
|---|---|---|---|
| 3,271,576 | 9/1966 | Turner | 250/222 M X |
| 3,385,159 | 5/1968 | Bliss et al. | 250/235 X |
| 3,495,913 | 2/1970 | Hoagland | 356/124 |
| 3,553,455 | 1/1971 | Sato et al. | 250/209 |
| 3,610,934 | 10/1971 | Turner | 250/235 |

*Primary Examiner*—Walter Stolwein
*Attorney*—Joseph M. Fitzpatrick et al.

[57] ABSTRACT

A device for generating a signal synchronous with focusing includes a photoelectric surface comprising pairs of photoelectric resistances or a combination of photoelectric diodes and resistances. Such photoelectric surface is vibrated back and forth with respect to the focal plane of a lens so that outputs produced in the pairs of photoelectric resistances or the combination of photoelectric diodes and resistances are subjected to full-wave rectification by rows of diodes and thereafter summed up by a transformer. Thus, a signal synchronous with the point of time at which the photoelectric surface is coincident with the focal plane of the lens may be obtained at the secondary winding of the transformer.

2 Claims, 3 Drawing Figures

DEVICE FOR GENERATING A SIGNAL SYNCHRONOUS WITH FOCUSING

BACKGROUND OF THE INVENTION

1. Field of the Invention

This invention relates to a device for generating a signal synchronous with the point of time at which a photoelectric surface vibrated back and forth with respect to the focal plane of a lens is coincident with such focal plane.

2. Description of the Prior Art

There has already been proposed a device in which a photoelectric surface comprising a number of photoelectric regions is vibrated back and forth with respect to the focal plane of a lens to thereby generate a signal synchronous with the point of time at which the photoelectric surface is coincident with the focal plane of the lens. Such a conventional device has required the use of an AC source or an oscillator in addition to a storage battery as a source of power.

SUMMARY OF THE INVENTION

The present invention is based on a concept entirely different from the conventional one, and intends to provide a device which does not require an AC power source or an oscillator, and in which a photoelectric surface comprising pairs of photoelectric elements is vibrated back and forth with respect to the focal plane of a lens with a vibration amplitude sufficiently greater than the depth of focus of the lens so that outputs produced in the pairs of photoelectric elements are passed through rows of diodes for full-wave rectification and thereafter are summed up or totalled by a transformer.

According to an embodiment of the present invention, the device for generating a signal synchronous with focusing includes a photoelectric surface which comprises a plurality of photoelectric resistance pairs connected together in parallel, the photoelectric resistances of each pair being connected in series. The photoelectric surface is adapted to be vibrated back and forth with respect to the focal plane of a lens with a vibration amplitude sufficiently greater than the depth of focus of the lens. A storage battery is connected as a power source in series with the parallel connection of the photoelectric resistance pairs. The serial connection of the battery and photoelectric resistance pairs is further connected in series with serial connections of capacitors and resistors. Rows of diodes are connected together in parallel for fullwave rectification of outputs produced in the pairs of photoelectric resistances, the diodes in each row being disposed in the same direction. These rows of diodes are connected with the primary winding of a transformer. Thus, there is provided a circuit in which the intermediate points between the diodes of the respective rows and the intermediate points between the resistances of the respective pairs are connected together in series, whereby a signal synchronous with the point of time at which the photoelectric surface is coincident with the focal plane of the lens may be derived from the secondary winding of the transformer through the circuit.

According to another embodiment of the present invention, the photoelectric surface adapted to be vibrated back and forth with respect to the focal plane of the lens may comprise a combination of pairs of photoelectric diodes and an auxiliary resistance serially connected with each of the pairs of photoelectric diodes. Such construction may result in the same effect as that attained by the above-described embodiment.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent construction as to not depart from the spirit and scope of the invention.

BRIEF DESCRIPTION OF THE DRAWINGS

A specific embodiment of the invention has been chosen for purposes of illustration and description, and is shown in the accompanying drawings, forming a part of the specification, wherein.

DESCRIPTION OF THE PREFERRED EMBODIMENTS

Figure 1:
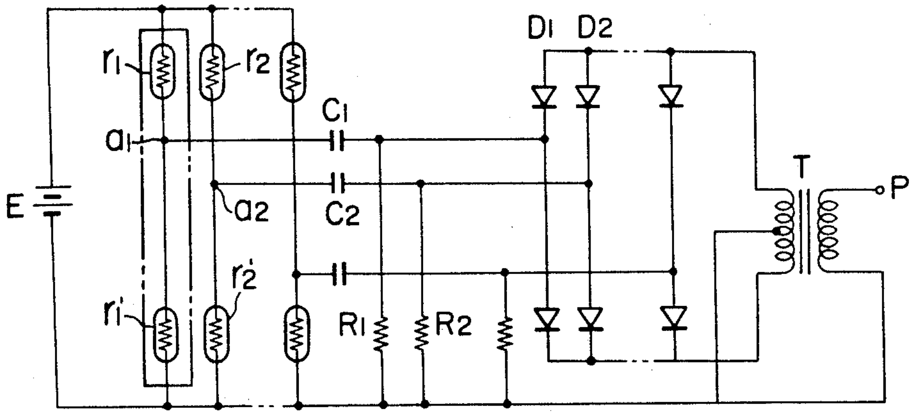
FIG. 1 is a circuit diagram showing an embodiment of the present invention.

Referring to FIG. 1, $r_1$, $r_1'$, $r_2$, $r_2'$ and so on designate pairs of photoelectric resistors which are provided densely to form a photoelectric surface. Each pair of resistors is a combination of CdS cells or the like having a substantially identical photoelectric characteristic, and each pair of resistors is adapted to receive uniform application of voltage from a storage battery E and to be vibrated back and forth with respect to the focal plane of a lens (not shown) with a predetermined vibration amplitude and frequency.

The quantity of light impinging upon each pair of photoelectric resistors is greatest when they are in the focal plane, and decreases according to the distance of such resistor pairs from the focal plane. Accordingly, potentials at respective intermediate points $a_1$, $a_2$ and so on between the photoelectric resistors of the respective pairs are varied with the vibration of these resistor pairs, but if the vibration amplitude of the photoelectric surface is sufficiently greater than the depth of focus of the lens, the potentials will assume asymmetrical voltage waveforms with respect to the mean value (i.e. ½E), as illustrated in FIG. 2(*a*) and (*b*) showing a graph of potential at the intermediate point between the photoelectric resistors versus time.

Figure 2:
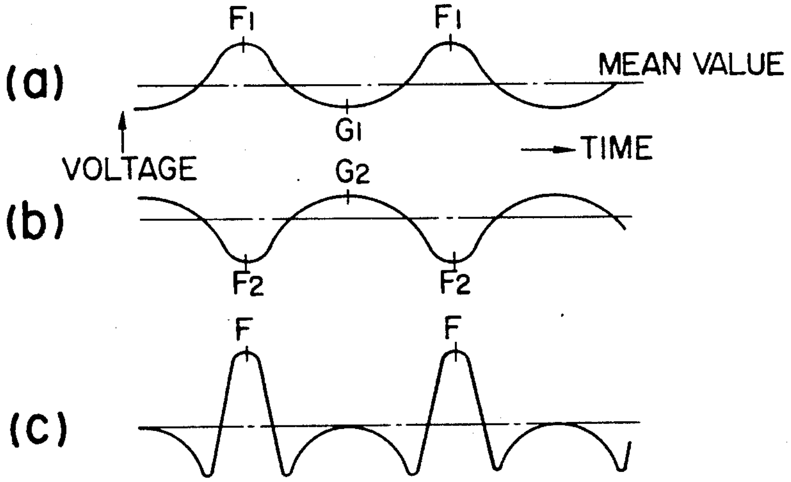
FIG. 2 is a graphical illustration of the voltage waveforms at intermediate points $a_1$, $a_2$ and so on in FIG. 1, with time represented by the abscissa.

FIG. 2(*a*) illustrates electronic potential of intermediate point $a_1$ where, for example, the resistance value of the photoelectric resistor $r_1$ in the pair $r_1$, $r_1'$ is smaller than that of the photoelectric resistor $r_1'$ (that is, when the image of an object having higher brightness is formed at the photoelectric resistor $r_1$, and the image of an object having lower brightness at the photoelectric resistor $r_2$). FIG. 2(*b*) shows an electric potential curve in a case when, for example, the resistance value of the photoelectric resistor $r_2$ in the pair of the photoelectric resistors $r_2$, $r_2'$ is greater than that of the photoelectric resistor $r_2'$.

In FIG. 2(*a*) or (*b*), sharp peak valves $F_1$ or $F_2$ represent the points of time at which the photoelectric surface is coincident with the focal plane, and it is seen that the positions of these peak valves $F_1$ and $F_2$ along the time axis are in accord with each other and that a less sharp peak $G_1$ or $G_2$ represents the point of time at which the distance between the photoelectric surface and the focal plane is maximum. Deviation of the sharp peaks $F_1$ or $F_2$ with respect to the mean value is variable both in magnitude and sense (positive or negative) depending on the shape of a formed image. However, a voltage of such waveform as shown in FIG. 2(*c*) can be derived at the terminal of the secondary winding in a transformer T by blocking any DC component at capacitors $C_1$, $C_2$ and so on, extracting AC components across resistors $R_1$, $R_2$ and so on, full-wave rectifying such AC components through rows of diodes $D_1$, $D_2$ and so on, and thereafter summing up the rectified AC components by means of the transformer T.

Since each peak valve F in FIG. 2(*c*) results from the combination of sharp peaks $F_1$ and $F_2$ shown in FIG. 2(*a*) or (*b*), it follows that a signal synchronous with focusing has been provided.

Figure 3:
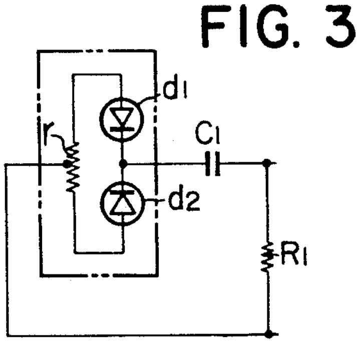
FIG. 3 is part of a circuit diagram showing another embodiment of the present invention.

Referring to FIG. 3, there is shown another embodiment of the present invention in which the photoelectric surface is formed by photoelectric diodes $d_1$ and $d_2$. In this alternative embodiment, each portion corresponding to the pairs of photoelectric resistors of FIG. 1 comprises a combination of photoelectric diodes $d_1$, $d_2$ and an auxiliary resistance *r* connected in the manner shown in FIG. 3, and if required, the matching of such portion with respect to the rows of diodes $D_1$, $D_2$ and so on may be adjusted by an amplifier or like means. In other respects, the embodiment of FIG. 3 is identical with that of FIG. 1.

The above-described arrangement of the present invention ensures that all the outputs produced in pairs of photoelectric resistors are summed up, and this results in a very high capability of producing synchronous signals from the focal plane, and in addition, eliminates the need to employ an AC power source or an oscillator which has been required in the prior art device.

I claim:

1. A device for generating a signal synchronous with focusing including:

a photoelectric surface comprising a plurality of photoelectric resistor pairs connected together in parallel, the photoelectric resistors of each of said pairs being connected in series, means adapted to vibrate said photoelectric surface back and forth with respect to the focal plane of a lens with a vibration amplitude sufficiently greater than the depth of focus of said lens;

a power source connected in series with said parallel connection of said photoelectric resistor pairs;

a plurality of serially connected capacitors and resistors, said serial connection of said power source and said photoelectric resistor pairs being further connected in series with said serial connections of capacitors and resistors;

rows of diodes connected together in parallel for full-wave rectification of outputs produced in said pairs of photoelectric resistors, the diodes in each of said rows being disposed in the same direction; and a transformer having the primary winding thereof connected with said rows of diodes;

thereby providing a circuit in which the intermediate points between the diodes of the respective rows and the intermediate points between the photoelectric resistors of the respective pairs are connected together in series;

whereby a signal synchronous with the point of time at which said photoelectric surface is coincident with the focal plane of the lens may be derived from the secondary winding of said transformer through said circuit.

2. A device for generating a signal synchronous with focusing including:

a photoelectric surface comprising a combination of pairs of photoelectric diodes and an auxiliary resistance serially connected with each of said pairs of photoelectric diodes, said photoelectric diodes of each pair being opposite in direction, means adapted to vibrate said photoelectric surface back and forth with respect to the focal plane of a lens with a vibration amplitude sufficiently greater than the depth of focus of said lens;

a power source connected in series with said combination of photoelectric diodes and auxiliary resistances;

a plurality of serially connected capacitors and resistors, said serial connection of said power source and said combination of photoelectric diodes and auxiliary resistances being further connected in series with said serial connections of capacitors and resistors;

rows of diodes connected together in parallel for full-wave rectification of outputs produced in said combination of photoelectric diodes and auxiliary resistances, the diodes in each of said rows being disposed in the same direction; and a transformer having the primary winding thereof connected with said rows of diodes;

thereby providing a circuit in which the intermediate points between the diodes of the respective rows and the intermediate points between the resistances of the respective pairs are connected together in series;

whereby a signal synchronous with the point of time at which said photoelectric surface is coincident with the focal plane of the lens may be derived from the secondary winding of said transformer through said circuit.

* * * * *